(12) United States Patent
Codilian et al.

(10) Patent No.: US 6,798,592 B1
(45) Date of Patent: Sep. 28, 2004

(54) METHOD FOR REDUCING POSITION ERROR SIGNAL IN A DISK DRIVE

(75) Inventors: Raffi Codilian, Irvine, CA (US); Joseph M. Viglione, Laguna Hills, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 439 days.

(21) Appl. No.: 09/945,563

(22) Filed: Aug. 31, 2001

(51) Int. Cl.[7] .................................................. G11B 5/09

(52) U.S. Cl. ............................................. 360/51; 360/48

(58) Field of Search ............................. 360/51, 48, 75

(56) References Cited

U.S. PATENT DOCUMENTS 6,611,390 B1 * 8/2003 Egan ........................... 360/31

* cited by examiner

Primary Examiner—David Hudspeth
Assistant Examiner—Varsha A. Kapadia
(74) Attorney, Agent, or Firm—Milad G. Shara, Esq.; Knobbe Martens Olson & Bear

(57) ABSTRACT

A method and an apparatus for reducing position error signal in a disk drive, which has an actuator and a magnetic medium, write the servo tracks with a servo track writer using a varying increment. The servo tracks are written after the servo track writer incrementally moves the actuator by a non-constant amount. The non-constant incrementing enables a servo track writing operation to write servo tracks that are at least as wide near the outer circumference as they are near the zero skew position or near the inner circumference.

8 Claims, 11 Drawing Sheets

METHOD FOR REDUCING POSITION ERROR SIGNAL IN A DISK DRIVE

BACKGROUND OF THE INVENTION

1. Field of the Invention

The present invention relates to an apparatus and method for writing servo tracks to a disk drive to reduce the sensitivity of the disk drive to sources of position error signal (PES).

2. Description of the Related Art

Disk drives generally have one or more rigid disks on which information can be permanently stored in the form of magnetic transitions written onto and read from the disks. These transitions are written onto and read from a plurality of generally concentric data tracks that are located on the disk. The reading and writing is performed by a head that is positioned over the disk surface by a rotary actuator. A servo system is provided on the disks to enable the head to access, or to seek, a particular track. One such servo system is an embedded servo system, where the servo information is written into servo sectors, i.e., arcuate portions of the concentric tracks reserved for the servo information. The servo sectors are located between data zones, i.e., acurate portion of the concentric tracks reserved for user data. Servo information is written into servo sectors in a process called servowriting.

Servowriting is performed during manufacturing in a device called a servo track writer. The servo track writer is configured to receive a disk drive sub-assembly, called a head disk assembly (HDA), that comprises one or more disks rotatably mounted on a spindle motor, a dedicated head mounted on a head actuator for each disk, and electronics designed to control the spindle motor, the head actuator, and the head. Once positioned in the servo track writer, the servo information can be written to the disks. The servo writing process also establishes the radial density of the tracks, which is typically measured in tracks per inch ("TPI"). More specifically, the servo track writer employs a push pin which is inserted into the HDA to engage the actuator arm. A head positioner circuit actuates the push pin by constant increments to position the heads radially over the disk while writing the servo information into the servo sectors. The HDA electronics biases the actuator arm against the push pin to facilitate precise positioning of the heads.

As mentioned above, the head is positioned over the disk on a rotary actuator and moved by constant increments by the push pin during servowriting. One consequence of the rotary motion of the head over the disk surface is that the head approaches the data zones at varying angles from the inner portion of the disk to the outer portion. At some point in the middle of the disk, a longitudinal axis through the head and a tangent line to the track rotating beneath the head are parallel. This is called the zero skew angle position. By contrast, at points on either side of the zero skew position, there is a skew angle between the longitudinal axis of the head and the tangent to the track. The skew angle increases as the head moves closer to the outer circumference. As a result, the tracks written near the outer circumference of the disk are narrower and closer together (i.e., have a higher track density) than the tracks written near the zero skew position.

Another result of higher skew angle at the outer diameter and the constant incrementing of the actuator by the push pin is that the TPI of tracks near the outer diameter is higher than the TPI near the zero skew position. Increased track density at the outer diameter has been considered a benefit because outer diameter tracks contain a higher proportion of bits than other tracks on the disk. However, track following is much more difficult at the outer diameter tracks for several reasons. The heads are subjected to more turbulence than at other parts of the disk. Also, the disk itself is less stable because vibrations induced in the disk, known as flutter, are greatest at the outer diameter. These and other factors make track following more difficult at the outer diameter compared to other positions in the range of motion of the actuator. This phenomenon can be observed as increased position error signal at the outer diameter tracks compared to other tracks in the drive.

SUMMARY OF THE INVENTION

A need exists for an apparatus and method to reduce the sensitivity of the servo system, as measured by position error signal, to turbulence and other physical stresses at the outer diameter. Further, there is a need to provide more servo margin at the disk outer diameter while at the same time increasing overall track density.

One aspect of the present invention is a method for reducing position error signal in a disk drive. The disk drive comprises a recording head, a rotary actuator, a spindle motor, and a storage medium mounted on the spindle motor. The storage medium comprises an inner circumference, an outer circumference, and a magnetic-storage portion between the inner circumference and the outer circumference. The magnetic-storage portion has a radial width. The magnetic-storage portion comprises a first radial band proximate the outer circumference that includes about one-third of the radial width. The magnetic-storage portion comprises a second radial band proximate the inner circumference that includes about one-third the radial width. The magnetic-storage portion also comprises a third radial band between the first radial band and the second radial band that includes about one-third the radial width. The method comprises writing a first plurality of generally concentric servo tracks to the storage medium in the first radial band at a first average servo track density. The method further comprises writing a second plurality of generally concentric servo tracks to the storage medium in the second radial band at a second average servo track density. The method further comprises writing a third plurality of generally concentric servo tracks to the storage medium in the third radial band at a third average servo track density. The first average servo track density is no greater than the second average servo track density. The first average servo track density is no greater than the third average servo track density.

Another aspect of the present invention is a disk drive that comprises a rotary actuator, a recording head mounted on the rotary actuator, a spindle motor, and a storage medium mounted on the spindle motor. The storage medium comprises an inner circumference, an outer circumference, and a magnetic-storage portion between the inner circumference and the outer circumference. The magnetic-storage portion has a radial width. The magnetic-storage portion comprises a first radial band proximate the outer circumference that includes about one-third of the radial width. The first radial band includes a first plurality of generally concentric servo tracks. The first plurality of concentric servo tracks are written at a first average servo track density. The magnetic-storage portion comprises a second radial band proximate the inner circumference that includes about one-third the radial width. The second radial band includes a second plurality of generally concentric servo tracks. The second plurality of servo tracks are written at a second average servo track density. The magnetic-storage portion further comprises a third radial band between the first radial band and the second radial band. The third radial band includes about one-third the radial width. The third radial band also includes a third plurality of generally concentric servo tracks. The third plurality of servo tracks are written at a third average servo track density. The first average servo track density is no greater than the second average servo track density. The first average servo track density is no greater than the third average servo track density.

Another aspect of the present invention is a servo track writer that writes servo tracks on a storage medium of a head-disk assembly. The head-disk assembly includes at least one recording head mounted on an actuator. The storage medium comprises an inner circumference, an outer circumference, and a magnetic-storage portion between the inner circumference and the outer circumference. The magnetic-storage portion has a radial width. The magnetic-storage portion comprises a first radial band proximate the outer circumference that includes about one-third of the radial width. The magnetic-storage portion comprises a second radial band proximate the inner circumference that includes about one-third the radial width. The magnetic-storage portion also includes a third radial band between the first radial band and the second radial band that includes about one-third the radial width. The servo track writer comprises a clock head that writes a clock reference pattern to the storage medium, and that reads the clock reference pattern from the storage medium. The servo track writer also comprises a timing circuit that processes the clock reference pattern read from the storage medium and that generates a timing clock. The servo track writer also comprises a controller that processes the timing clock to determine the circumferential location of the recording head and that directs the recording head to write the servo tracks to the storage medium. The servo track writer also comprises a push pin, and a head positioner circuit. The head positioner circuit comprises a positioning mechanism that actuates the push pin in a step-wise fashion to impart a step-wise movement to the actuator. The step-wise motion is imparted by the push pin at a first average stepping increment when the recording head is over the first radial band. The step-wise motion is imparted by the push pin at a second average stepping increment when the recording head is over the second radial band. The step-wise motion is imparted by the push pin at a third average stepping increment when the recording head is over the third radial band. The first average stepping increment is also greater than the second stepping increment. The first average stepping increment is greater than the third stepping increment.

Another aspect of the present invention is a disk drive that comprises a rotary actuator, a recording head mounted on the rotary actuator, a spindle motor, and a storage medium mounted on the spindle motor. The storage medium comprises an inner circumference, an outer circumference, and a magnetic-storage portion between the inner circumference and the outer circumference. The magnetic-storage portion has a radial width. The magnetic-storage portion comprises a first radial band proximate the outer circumference that includes about one-third of the radial width. The magnetic-storage portion also comprises a second radial band proximate the inner circumference that includes about one-third the radial width. The magnetic-storage portion also comprises a third radial band between the first radial band and the second radial band that includes about one-third the radial width. A first plurality of servo tracks are written to the storage medium in the first radial band at a first average servo track density. A second plurality of servo tracks are written to the storage medium in the second radial band at a second average servo track density. A third plurality of servo tracks are written to the storage medium in the third radial band at a third average servo track density. The first average servo track density is no greater than the second average servo track density. The first average servo track density is no greater than the third average servo track density.

Another aspect of the present invention is a servo writer and disk drive combination. The disk drive comprises a recording head, a rotary actuator, a spindle motor, and a storage medium mounted on the spindle motor. The storage medium comprises an inner circumference, an outer circumference, and a magnetic-storage portion between the inner circumference and the outer circumference. The magnetic-storage portion has a radial width. The magnetic-storage portion comprises a first radial band proximate the outer circumference that includes about one-third of the radial width. The magnetic-storage portion also comprises a second radial band proximate the inner circumference that includes about one-third the radial width. The magnetic-storage portion also includes a third radial band between the first radial band and the second radial band that includes about one-third the radial width. The servo track writer comprises a clock head that reads a magnetic clock pattern in a clock track of the storage medium, and a timing circuit that processes the clock pattern and generates a timing clock. The servo track writer also comprises a controller that processes-the timing clock to determine the circumferential location of the head and that directs the head to write the servo tracks. The servo track writer also includes a push pin that engages the rotary actuator in the disk drive, and a head positioner circuit. The head positioner circuit comprises a positioning mechanism that actuates the push pin in a step-wise fashion to impart a step-wise movement to the actuator. The step-wise motion is imparted by the push pin at a first average stepping increment when the recording head is located over the first radial band. The step-wise motion is imparted by the push pin at a second average stepping increment when the recording head is located over the second radial band. The step-wise motion is imparted by the push pin at a third average stepping increment when the recording head is located over the third radial band. The first average stepping increment is greater than the second average stepping increment. The first average stepping increment is also greater than the third average stepping increment.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

DETAILED DESCRIPTION OF THE PREFERRED EMBODIMENT

Figure 1:
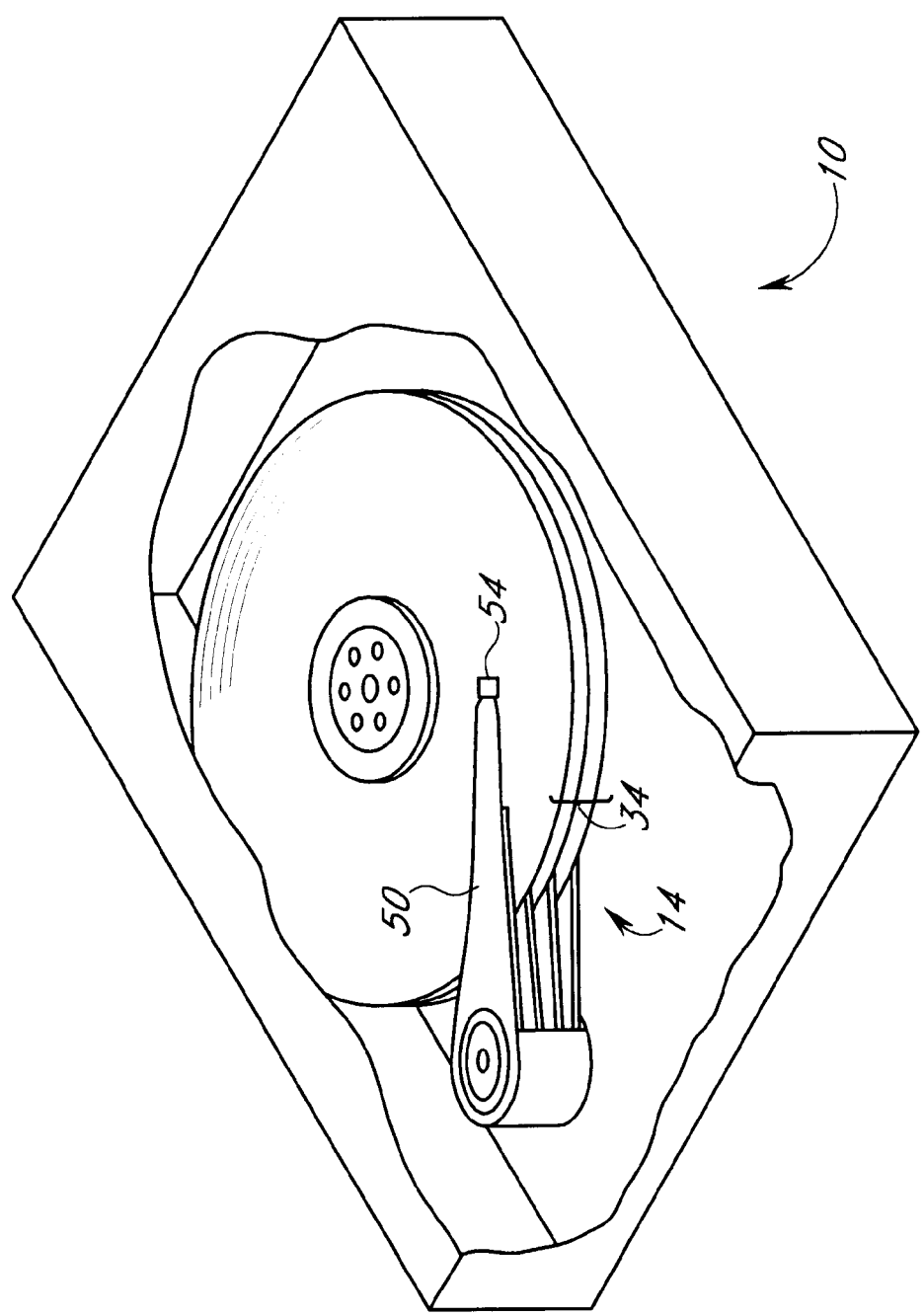
FIG. 1 is a block diagram of a disk drive comprising a HDA.
Figure 2B:
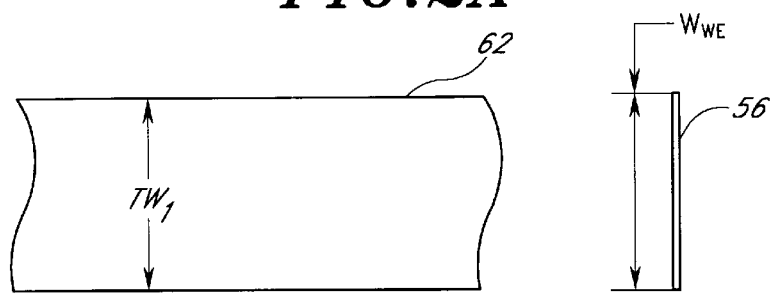
FIG. 2B shows a writing element of the recording head and the track written by the element near the zero skew position on the disk shown in FIG. 2A.
Figure 2C:
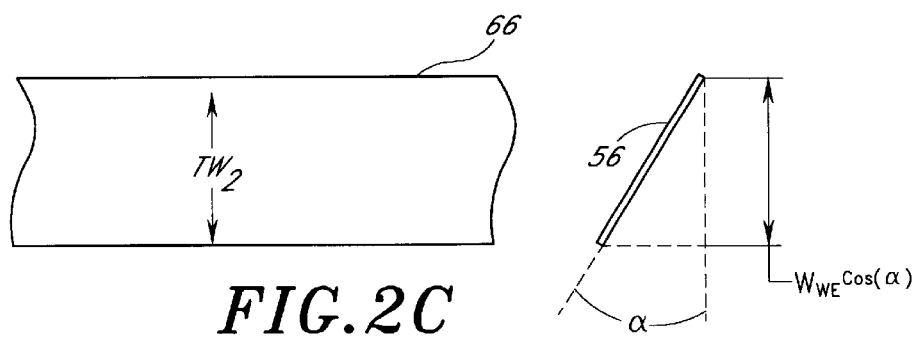
FIG. 2C shows a writing element of the recording head and the track written by the element near the outer circumference of the disk shown in FIG. 2A.
Figure 3:
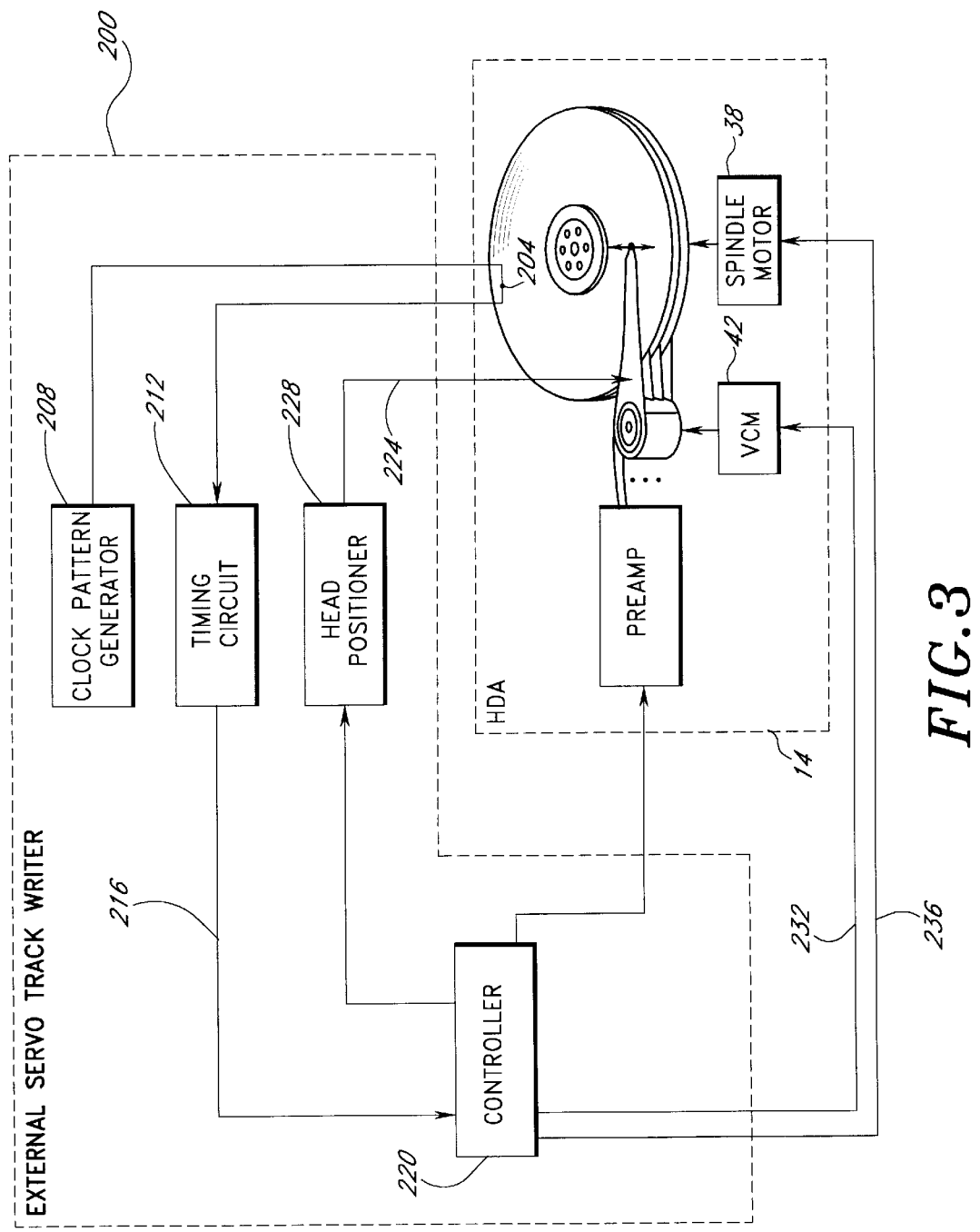
FIG. 3 pictorially illustrates the HDA of FIG. 1 inserted during manufacturing into an external servo track writer that writes servo tracks according to the method described herein.

FIG. 1 shows a disk drive 10 comprising a head-disk assembly (HDA) 14 that includes an array of magnetic disks, or storage media 34, a rotary actuator 50, a plurality of recording heads 54 attached to the actuator arms, and a spindle motor 38 (see FIG. 3). Each of the heads 54 further comprises a writing element 56 that is generally perpendicular the longitudinal axis of the head, shown schematically in FIGS. 2B–2C. The disk drive 10 also includes a voice-coil motor (VCM) 42 that positions the actuator 50 and heads 54 (see FIG. 3). The magnetic disks 34 also comprise servo tracks that include embedded servo sectors which are recorded at a regular interval and interleaved with the data sectors. The operation of a disk drive incorporating embedded servo sectors to enable the seeking and tracking operations necessary to write and read data to the data sectors is known in the art and will not be described in more detail herein.

Figure 2A:
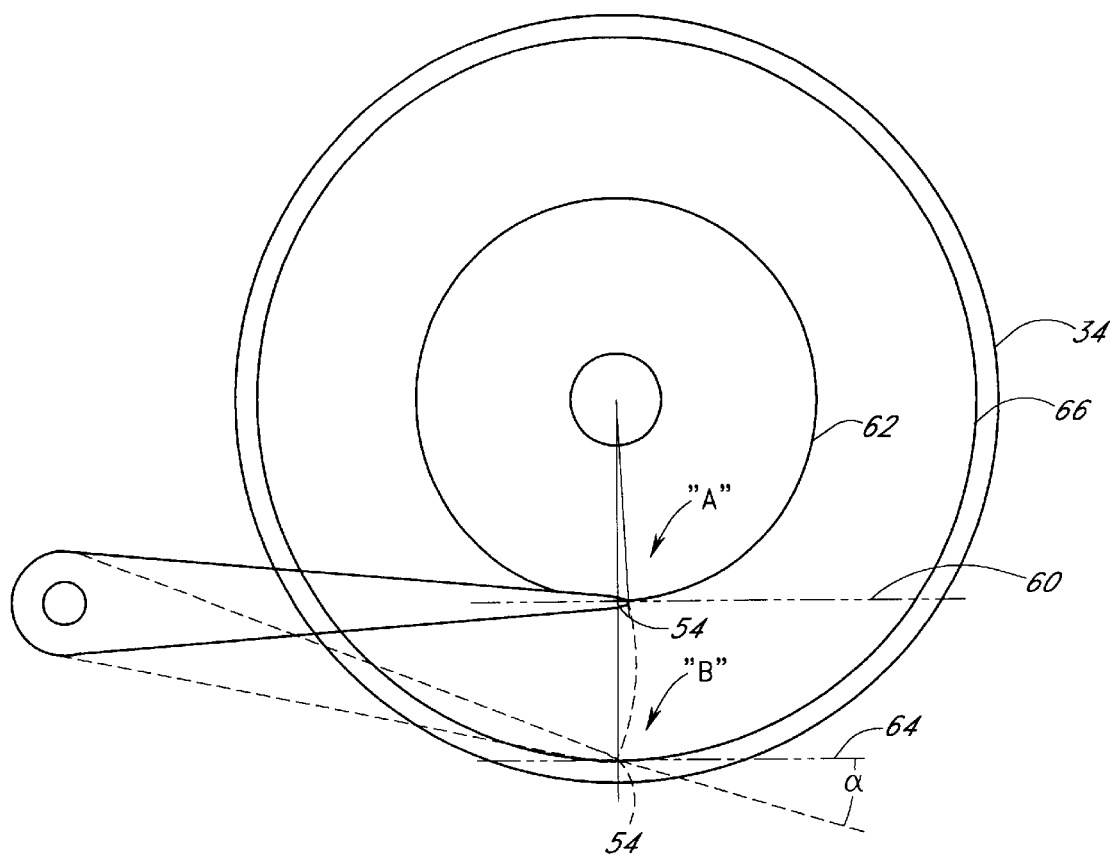
FIG. 2A shows the recording head alternately positioned near the middle of the disk and near the outer circumference of the disk.

As illustrated in FIG. 2A, the angle of any of the heads 54 with respect to the surface of the storage medium 34 rotating directly below, called the "skew angle," varies as the head 54 moves through the arc of the actuator 50. As can be seen at position "A," a longitudinal axis passing through the head 54 is aligned with a tangent 60 to a track 62. As can be seen at position "B," a longitudinal axis passing through the head 54 is at an angle α with respect to a tangent 64 to a track 66 near the outer circumference of the storage medium 34.

As discussed above, each of the heads 54 comprises a writing element 56 that is generally perpendicular to the longitudinal axis of the head. Therefore, the writing element 56 of the head 54 approaches the track 62 beneath the head 54 at position "A" at a 90-degree angle. FIG. 2B shows that this perpendicular approach of the element 56 at position "A" causes the element 56 to write the track 62 to a width $TW_1$. This width is approximately equal to the width $W_{WE}$ of the writing element 56.

By contrast, the writing element 56 does not write as wide a track when at position "B." When the actuator 50 moves to position "B," and the head 54 is over the track 66, the writing element 56 is no longer perpendicular to the track 66. Rather, the writing element 56 approaches the track 66 at an angle 90-α, where a is the angle between a tangent 64 to the track 66 at position "B" and the longitudinal axis of the head 54. FIG. 2C shows that the non-perpendicular approach of the writing element 56 to the track rotating beneath at position "B" causes the writing element 56 to write the track 66 to a width $TW_2$. As may be seen, $TW_2$, which is approximately equal to $W_{WE}$ times cos(α), is less than $TW_1$ for non-zero skew angles. Moreover, as the angle α increases, the width $TW_2$ decreases.

The servo tracks are written to the storage media 34 as part of a manufacturing process known as servo track writing. An external servo track writer can be employed to simultaneously write the servo tracks to all of the recording surfaces during the manufacture of the disk drive 10 shown in FIG. 1. FIG. 3 shows the HDA 14 of the disk drive 10 of FIG. 1 inserted into an external servo track writer 200. The servo track writer 200 uses the preamplifier and heads within the HDA 14, but uses separate control circuitry and servo mechanics for radially positioning the heads using well known techniques, such as a laser interferometer, or other positioning mechanism. The external servo track writer 200 comprises a "clock head" 204 positioned over one of the recording surfaces and a clock reference pattern generator 208 for writing a magnetic clock reference pattern on the storage medium 34. When bank writing the servo tracks, the magnetic clock reference pattern is read by the clock head 204 and processed by a timing circuit 212, which generates a timing clock 216 applied to a controller 220. The controller 220 preferably processes the timing clock 216 to derive the precise circumferential location of the heads 54 with respect to the tracks so that the servo sectors are written at the same circumferential location from the inner to outer diameter tracks.

The external servo track writer 200 further comprises a push pin 224 which is inserted into the HDA 14 and into a hole in the actuator arm 50. A head positioner circuit 228, suitably comprising a laser interferometer, or other suitable positioning mechanism, actuates the push pin 224 in order to precisely position the heads 54 radially over the disk 34 while writing the servo sectors (servo data and servo bursts). Conventionally, the increment is a constant value. As described in more detail below, the applicants propose incrementing the push pin 224 in a non-constant manner, preferably with increasing increment toward the outer circumference of the storage medium. The controller 220 applies a reverse direction bias current to the coil of the VCM 42 over line 232 in order to bias the actuator arm 50 against the push pin 224 to facilitate precise positioning of the heads 54. The controller 220 also applies a current to the coil of the spindle motor 38 over line 236 in order to spin up the disks 34 and then rotate the disks 34 at a substantially constant angular velocity. Thus, as is known, the servo track writer 200 writes the servo tracks on the storage media 34.

Figure 4A:
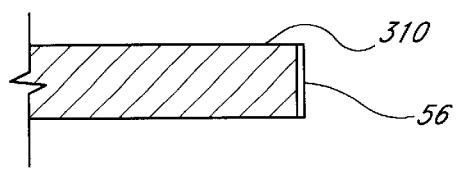
FIG. 4A shows a first pass write of a first servo track at the zero-skew position.
Figure 4B:
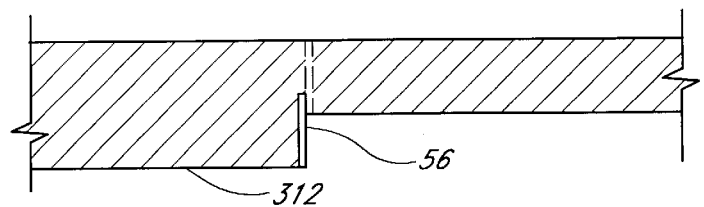
FIG. 4B shows a second pass write of the first servo track at the zero-skew position.

FIGS. 4A–4F pictorially represents the servo track writing process for a writing element 56 near a portion of the disk having a zero-degree skew angle, i.e., the "zero skew" position. FIG. 4A shows the writing element 56 writing a first pass 310 of a first servo track 316. FIG. 4B shows the writing element 56 writing a second pass 312 of the first servo track 316 after the element has been incremented by an amount.

As may be seen, the element 56 erases a portion of the first pass 310 written in FIG. 4A. This erasure of the portion of the next-previously written track pass is due to an overlapping portion of the writing element 56. That is, the amount of the increment is less than or equal to the width of the head 34. Preferably, the increment amount is less than the width of the head 34. As will be discussed in more detail below, as the overlap becomes smaller, the width of two adjacently written servo passes becomes larger.

Figure 4C:
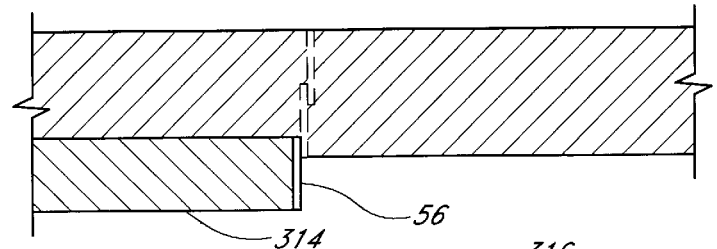
FIG. 4C shows a first pass write of a second servo track adjacent the first servo track written in FIGS. 4A–4B.

It will be understood by one skilled in the art that the first pass 310 and second pass 312 of the servo track 316 are stitched together. As is known in the art, the stitching is performed by the servo track writer to create a single servo track having a width greater than the width of the head 34. FIG. 4C shows the writing element 56 writing a first pass 314 of a second servo track 322. As in FIG. 4B, the writing element 56, while writing the first pass 314 of the second track 322, erases a portion of the second pass 312. Once the first pass 314 of the second track 322 is complete, the width of the first track 316 is defined.

Figure 4D:
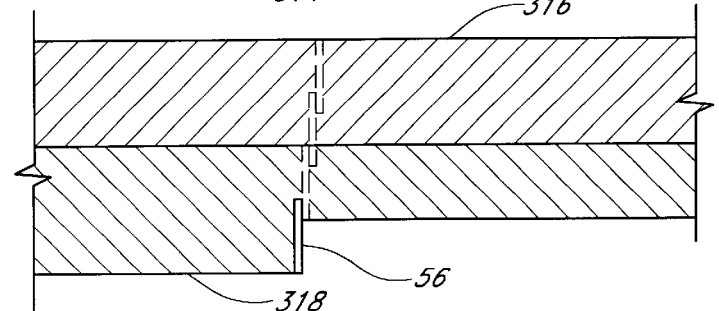
FIG. 4D shows a second pass write of the second servo track adjacent the first servo track written in FIGS. 4A–4B.
Figure 4E:
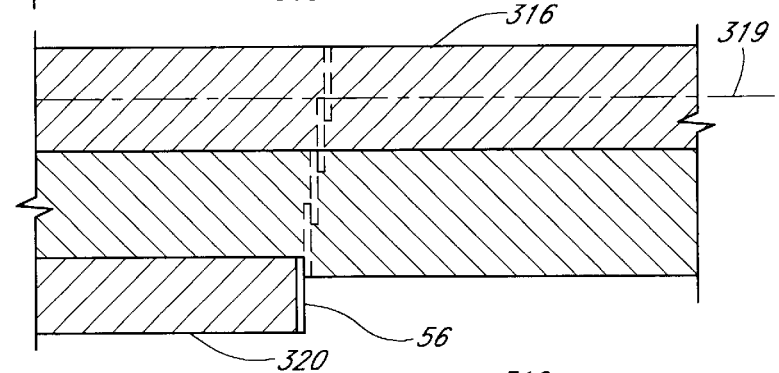
FIG. 4E shows a first pass write of a third servo track adjacent the second servo track written in FIGS. 4C–4D.
Figure 4F:
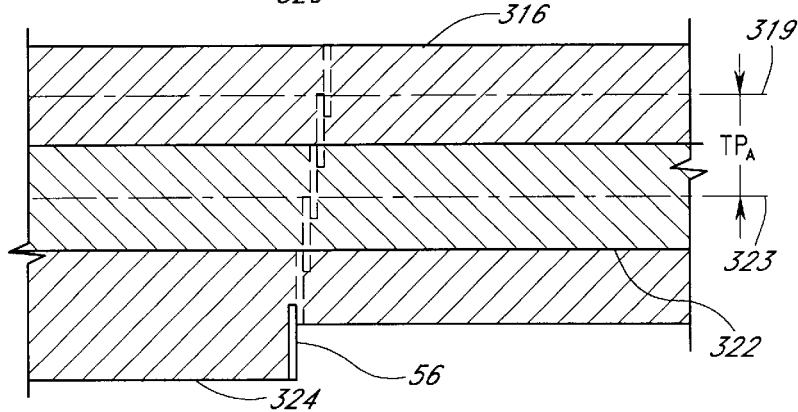
FIG. 4F shows a second pass write of a third servo track adjacent the second servo track written in FIGS. 4C–4D.

FIG. 4D shows the writing element 56 writing a second pass 318 of the second servo track 322. As discussed above in connection with FIG. 4B, the first pass 314 and the second pass 318 of the second servo track 322 are stitched together. FIG. 4E shows the writing element 56 writing a first pass 320 of a third servo track. As discussed above, the first pass 320 of the third servo track erases a portion of the second pass 318 of the second servo track 322. Thus, the width of the track 322 is defined. FIG. 4E also shows a centerline 319 of the track 316. FIG. 4F shows the writing element 56 writing a second pass 324 of the third servo track. As discussed above, the second pass 324 of the third servo track and the first pass 320 of the third servo track are stitched together in the conventional manner. FIG. 4F shows the centerline 319 of the first track 316 and a centerline 323 of the second servo track 322. As shown, a track pitch $TP_A$ may be defined as the perpendicular distance between the centerline 319 of the first servo track 316, and the centerline 323 of the second servo track 322.

FIGS. 5A–5F pictorially represent the servo track writing process for a writing element 56 near a portion of the disk having a relatively high skew angle, e.g., near the outer circumference of the storage medium 34.

Figure 5A:
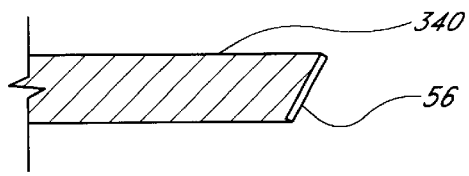
FIGS. 5A–5F are similar to FIGS. 4A–4F and show the passes for writing servo tracks at a high skew position of the HDA using a conventional stepping increment to move the actuator.
Figure 5B:
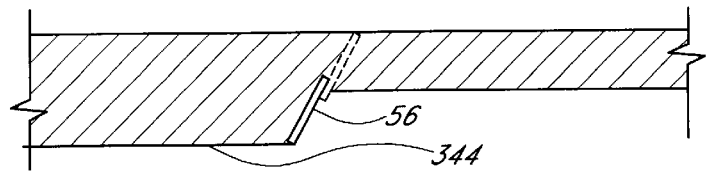
Figure 5C:
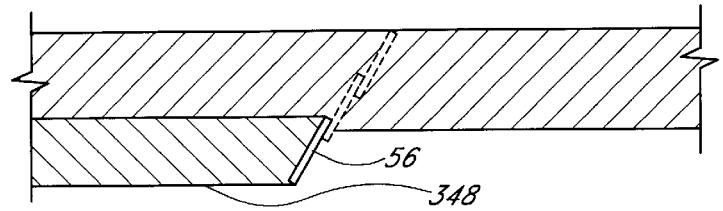

FIG. 5A shows the writing element 56 writing a first pass 340 of a first servo track 352. FIG. 5B shows the writing element 56 writing a second pass 344 of the first servo track 352. As shown, the element 56 erases a portion of the first pass 340 written in FIG. 5A. As discussed above, one skilled in the art will recognize that the first pass 340 and second pass 344 of the servo track 352 can be stitched together by the servo track writer. FIG. 5C shows the writing element 56 writing a first pass 348 of a second servo track 370. The writing element 56, while writing the first pass 348 of the second track 370, also erases a portion of the second pass 344 of the first servo track 352. Once the first pass 348 of the second track 370 is complete, the width of the first track 352 is defined.

Figure 5D:
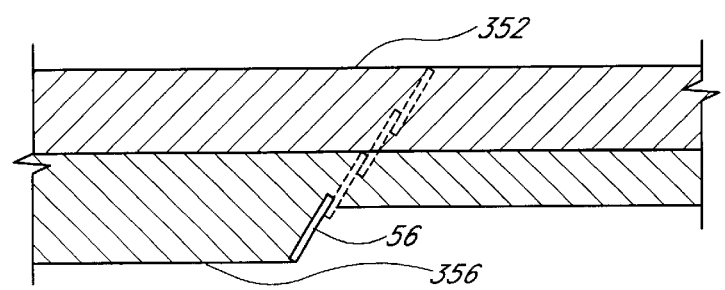
Figure 5E:
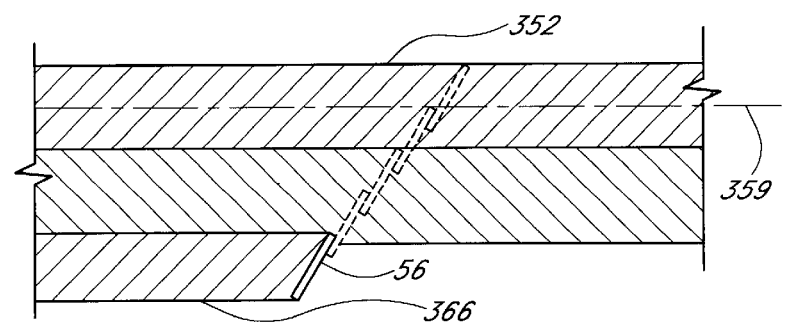
Figure 5F:
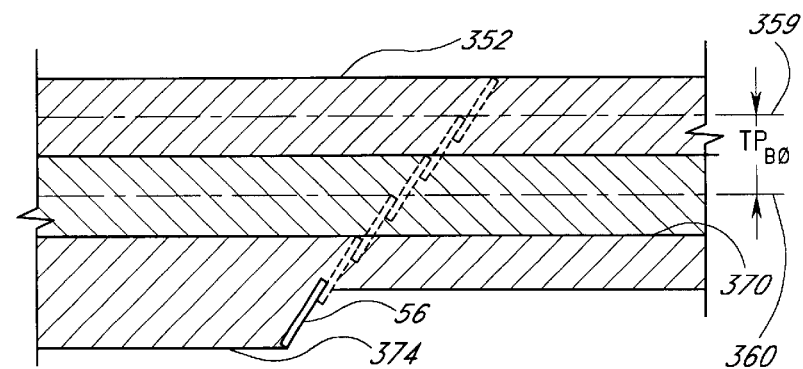

FIG. 5D shows the writing element 56 writing a second pass 356 of the second servo track 370. As discussed above in connection with FIG. 5B, the first pass 348 and the second pass 356 of the second servo track 370 are stitched together. FIG. 5E shows the writing element 56 writing a first pass 360 of a third servo track. As discussed above, the first pass 360 of the third servo track erases a portion of the second pass 356 of the second servo track 370. Thus, the width of the track 370 is defined. FIG. 5E also shows a centerline 359 of the track 352. FIG. 5F shows the writing element 56 writing a second pass 374 of the third servo track. As discussed above, the second pass 374 of the third servo track and the first pass 366 of the third servo track are stitched together in the conventional manner. FIG. 5F shows the centerline 359 of the first track 352 and a centerline 360 of the second servo track 370. As shown, a track pitch $TP_{BO}$ may be defined as the perpendicular distance between the centerline 359 and the centerline 360.

As discussed above, the servo writer conventionally moves the heads 54 on the rotary actuator 50 by incrementing the push pin 224. Conventionally, the increment is a constant value. Although the push pin 224 is moved by a constant increment, the servo track density written on the storage medium 34 by this method is not constant across the storage medium. As discussed above in connection with FIGS. 2A–2C, the effective width of a written track is less at high skew angles than it is at the zero skew position. This effect can be seen in the servo track writing process by comparing the track pitch at the zero skew condition with the track pitch at high skew angles. As may be seen, the value of $TP_A$ in FIG. 4F is significantly greater than the value of $TP_{BO}$ in FIG. 5F.

Figure 6A:
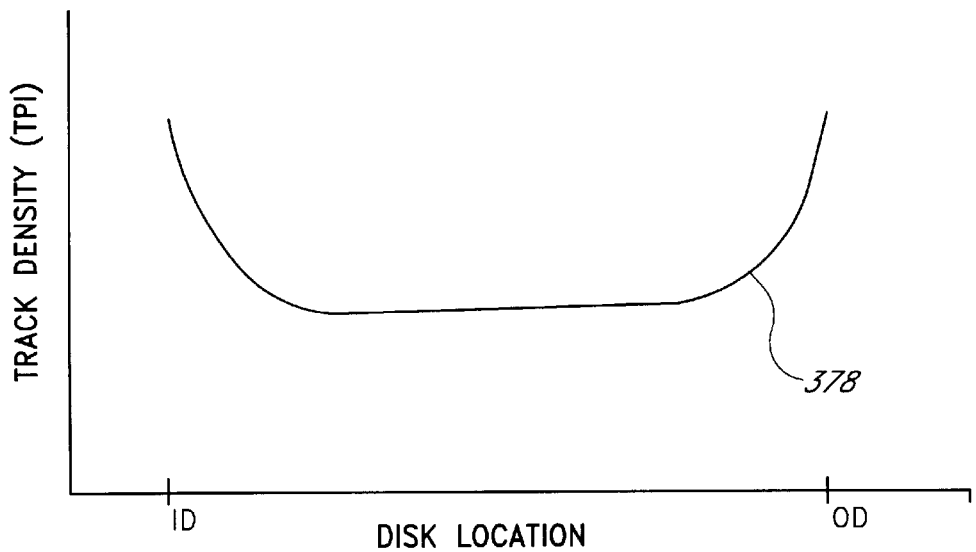
FIG. 6A shows a "bathtub" curve representing track density as a function of disk location for the servo writing process illustrated in FIGS. 4A–4F and FIGS. 5A–5F.
Figure 6B:
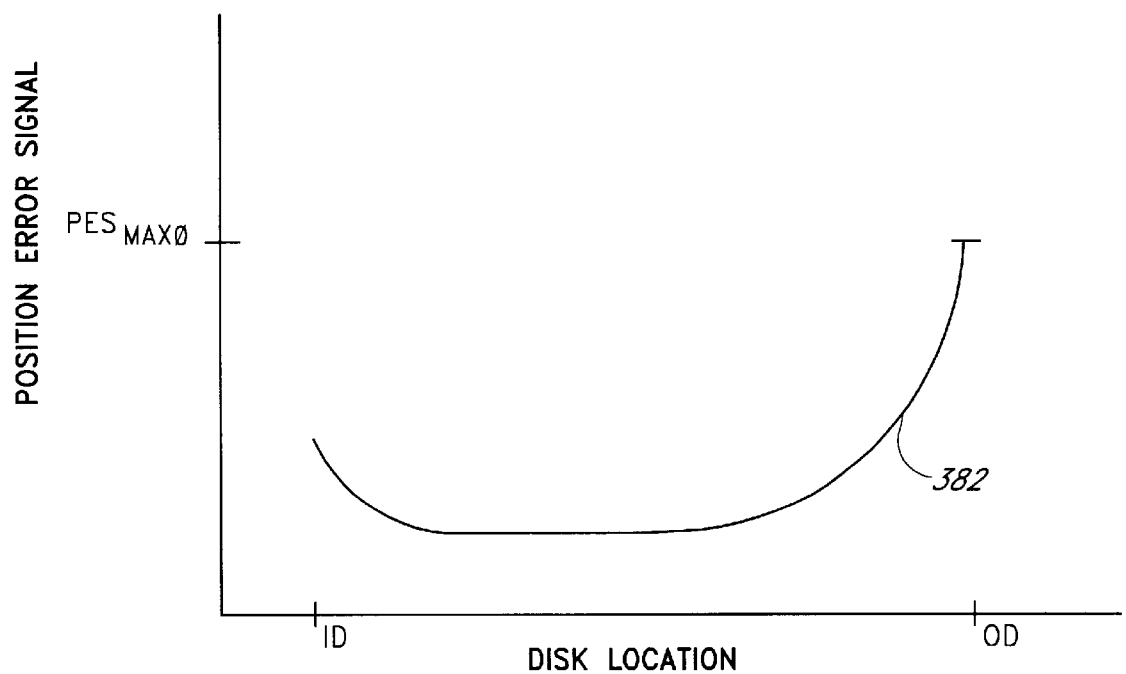
FIG. 6B shows the position error signal as a function of location for the bathtub curve shown in FIG. 6A.

FIGS. 6A–6B show a corresponding change in the track density at the zero skew condition and at the relatively high skew condition. It is well known that track density is inversely related to track pitch. FIG. 6A shows a "bathtub" curve 378, which is a plot of track density, in tracks per inch (TPI) on the y-axis and disk location on the x-axis. The curve generally has the shape of a cross-section of a bathtub. The track density near the inner circumference of the storage medium (marked "ID") is represented toward the left of the 378. The track density is relatively high because the head 54 is at a relatively high skew angle, as discussed above. The track density near the outer circumference of the storage medium 34 (marked "OD") is represented toward the right of the curve 378. The track density there again is relatively high because the head 54 is at relatively high skew angle. The track density decreases between the "ID" position and the "OD" position because the skew angle decreases between those positions.

FIG. 6B shows a position error signal (PES) curve 382 as a function of location on the storage medium for the bathtub curve 378 shown in FIG. 6A. As shown, the PES at the OD position, proximate the outer circumference, is much greater than the PES at the ID position proximate the inner circumference. As used herein, the term "proximate" means close to, and does not require the constituents that are "proximate" to be adjacent. The PES at the OD and the PES at the ID are both greater than the PES in the middle portion of the storage medium. Higher PES indicates that the head 54 is relatively far from the centerline of track below. The OD of the storage medium also generally has larger PES due to adverse mechanical conditions at that position. Accordingly, under standard servo track writing conditions exhibiting a bathtub-shaped track density profile, the PES value is greatest at the OD position, indicated as $PES_{MAX0}$ on FIG. 6B. The applicants have determined that in order to improve the PES near the OD of the storage medium 34, the servo tracks must be written differently, as will now be discussed in more detail.

Figure 7A:
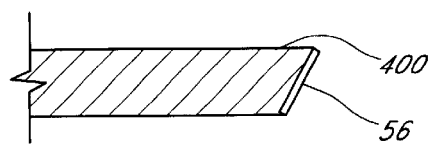
FIGS. 7A–7F are similar to FIGS. 5A–5F and show the passes for writing servo tracks at a high skew position of the HDA using a different, larger stepping increment than was used in FIGS. 5A–5F.
Figure 7B:
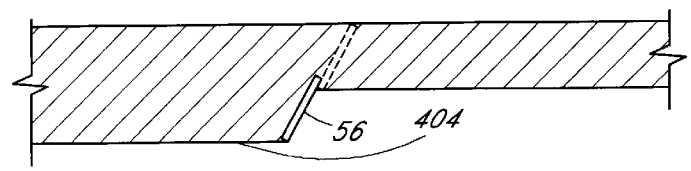
Figure 7C:
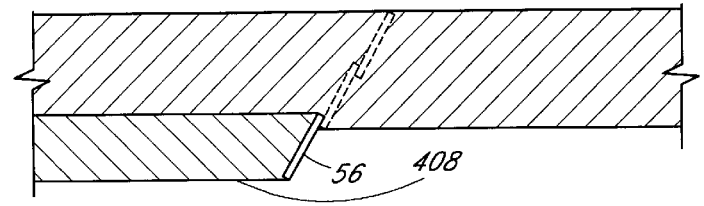
Figure 7D:
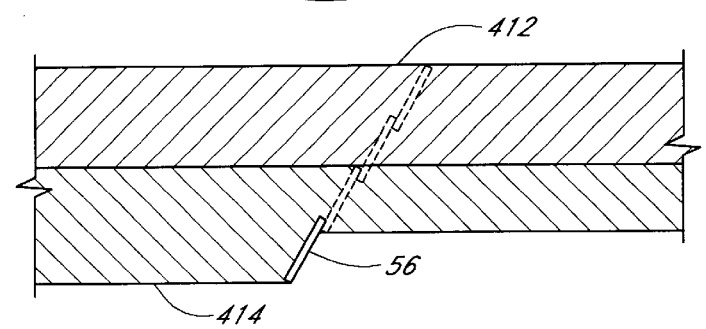
Figure 7E:
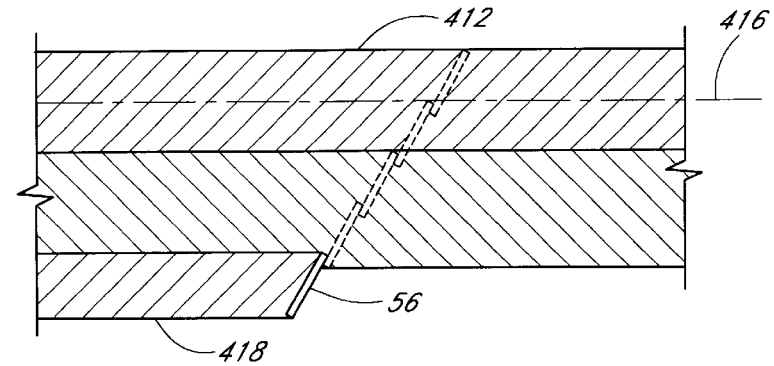
Figure 7F:
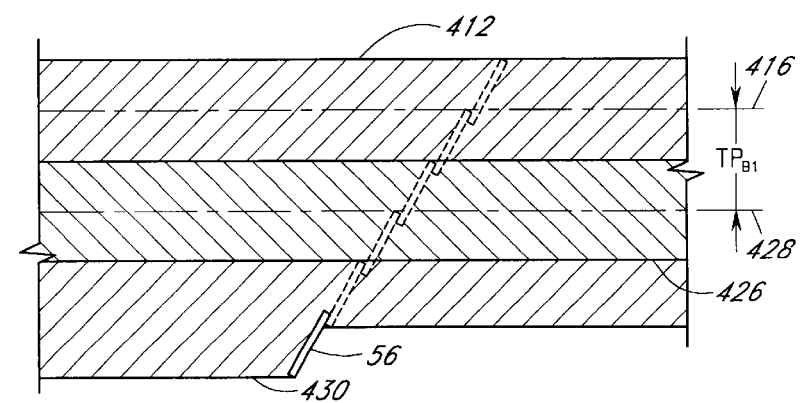

FIGS. 7A–7F pictorially represent one variation of the servo track writing process wherein the stepping increment of the push pin 224 is non-constant, increasing toward the outer circumference. In FIGS. 7A–7F, the same servo tracks are written as in FIGS. 5A–5F. A first track 412 comprises a first pass 400 and a second pass 404, and has a centerline 416, as shown in FIG. 7F. A second track 426 comprises a first pass 408 and a second pass 414, and has a centerline 428, as shown in FIG. 7F. A third track comprises a first pass 418 of the third track, and a second pass 430. A perpendicular distance $TP_{B1}$ between the centerline 416 and the centerline 428 is shown in FIG. 7F. As discussed above, there is a small amount of overlap between the each of the adjacent passes 400, 404, 408, 414, 418, and 430. However, the amount of overlap in the FIGS. 7A–7F is less in than the overlap in FIGS. 5A–5F. As a result, the perpendicular distance $TP_{B1}$ shown in FIG. 7F is greater than the perpendicular distance $TP_{B0}$ shown in FIG. 5F.

Figure 8A:
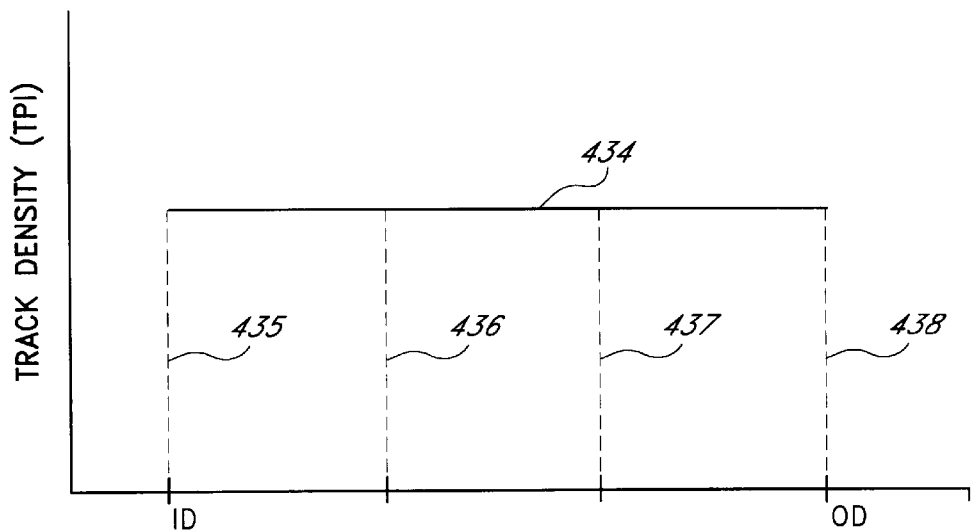
FIG. 8A shows a curve representing track density as a function of disk location wherein the effective track density is substantially constant.

As discussed above, the wider track pitch $TP_{B1}$ results in a lower track density at the high skew condition of the servo tracks written according to FIGS. 7A–7F compared to the servo tracks written according to FIGS. 5A–5F. FIG. 8A shows a track density curve 434 that illustrates the track density profile across the storage medium 34 for the process illustrated in FIG. 7A–7F. As shown, the track density is constant across the storage medium 34. This is achieved by varying the stepping increment of the push pin 224. As the head moves toward the higher skew condition near the outer circumference, the stepping increment of the push pin 224 is increased.

As discussed in more detail below in connection with FIG. 11, the useable portion of the storage medium 34 may be divided into three radial bands of approximately equal radial width. A first radial band, comprising approximately the outer one-third of the useable portion of the storage medium, is illustrated in FIG. 8A as extending between a line 437 and a line 438. A second radial band, comprising approximately the inner one-third of the useable portion of the storage medium, is illustrated in FIG. 8A as extending between a line 435 and a line 436. A third radial band, comprising approximately the middle one-third of the useable portion of the storage medium, is illustrated on FIG. 8A as extending between the line 436 and the line 437. The average servo track density of the first radial band is no greater than the average servo track density of the second band. The average servo track density of the first radial band is also no greater than the average servo track density of the third band.

Because of the decrease in the servo track density of the first band (outer portion) of the storage medium, the overall data storage capacity of the storage medium would be decreased; however, as shown in FIG. 6A, the stepping increment of the actuator is selected for the third radial band (middle portion) so that the servo track density of the third radial band is increased with respect to the servo track density of the corresponding middle portion of the storage medium in FIG. 6A. The increase in servo track density of the third radial band compensates, at least in part, for the decrease in servo track density of the first radial band proximate to the outer circumference of the storage medium to reduce the decrease in the overall data storage capacity of the storage medium.

Figure 8B:
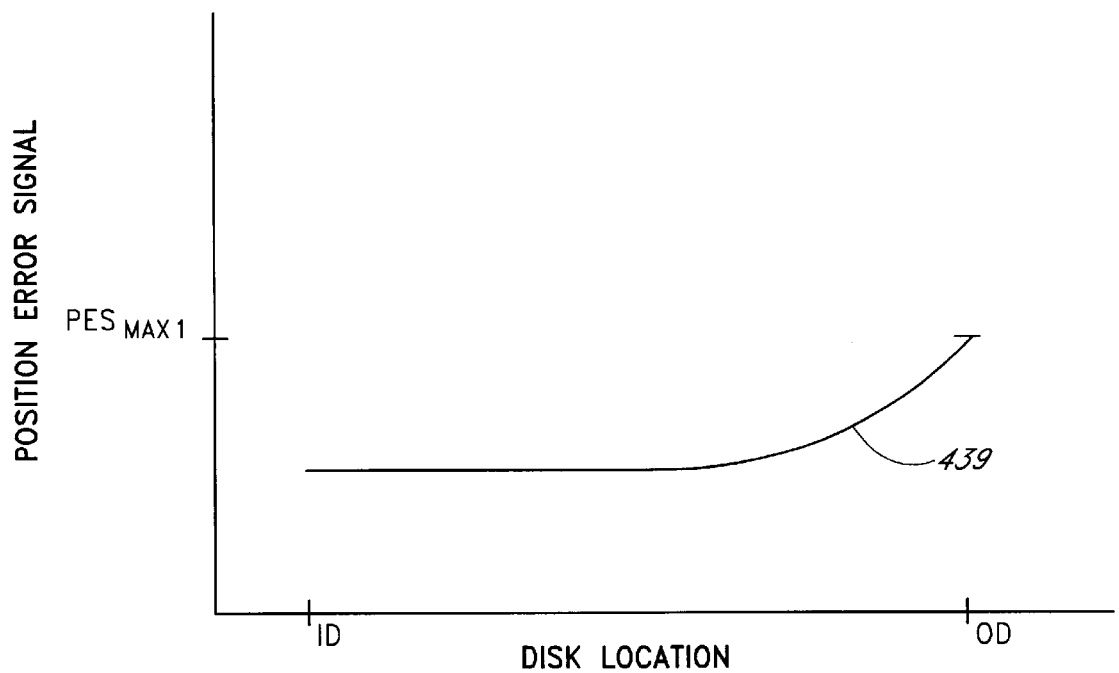
FIG. 8B shows the position error signal as a function of location for the curve shown in FIG. 8A.

FIG. 8B shows a PES curve 439 that illustrates the PES corresponding to the constant track density profile of FIG. 8A. The PES values may still rise at the outer circumference compared to the inner circumference. However, the highest PES value at the outer circumference, $PES_{MAX1}$, is lower than the $PES_{MAX0}$ shown in FIG. 6B. By lowering the PES value at the OD, the applicants have discovered that many of the tracks at the OD that would have been retired, i.e., deemed unsuitable for storing data, can be used. Note that the increased servo track density in the third band causes the overall PES curve in FIG. 8B to be shifted upward with respect to FIG. 6B, indicating that the PES in the third band (i.e., middle portion) of the storage medium has increased. The PES of the servo tracks in the third band, as well as the PES of the servo tracks in the first band (outer portion) and the second band (inner portion) are still less than a maximum acceptable PES magnitude.

Figure 9A:
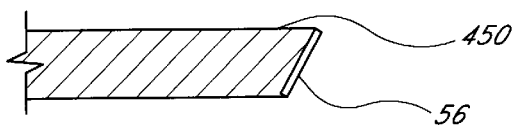
FIGS. 9A–9F are similar to FIGS. 7A–7F and show the passes for writing servo tracks at a high skew position using a different, higher stepping increment than was used in FIGS. 7A–7F.
Figure 9B:
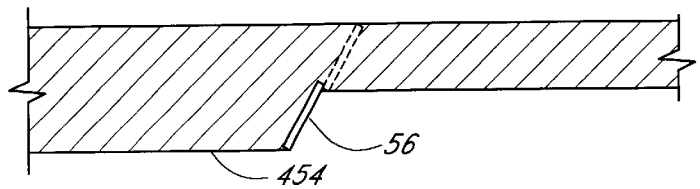
Figure 9C:
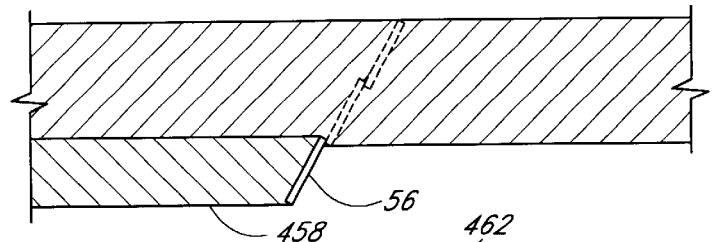
Figure 9D:
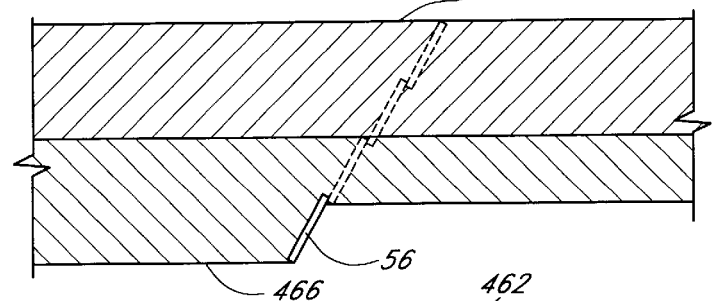
Figure 9E:
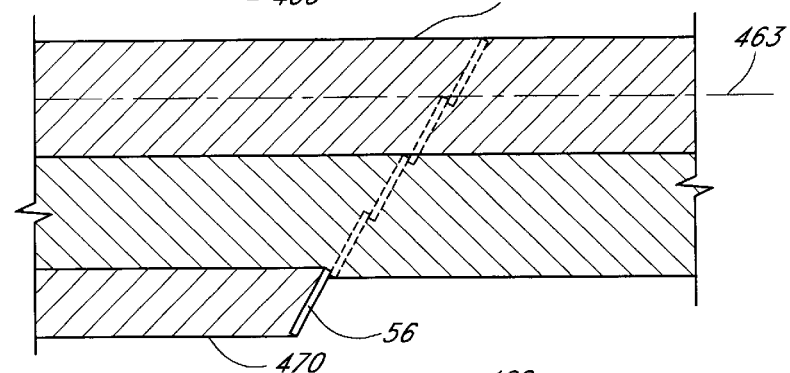
Figure 9F:
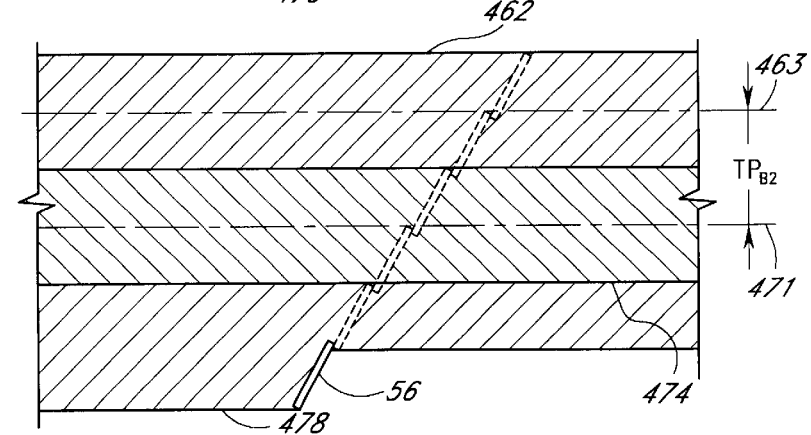

FIGS. 9A–9F pictorially represent another variation of the servo track writing process wherein the stepping increment of the push pin 224 is non-constant, increasing toward the outer circumference. In FIGS. 9A–9F, the same servo tracks are written as in FIGS. 5A–5F. A first servo track 462 comprises a first pass 450 and a second pass 454, and has a centerline 463, as shown in FIG. 9F. A second track 474 comprises a first pass 458 and a second pass 466, and has a centerline 471, as shown in FIG. 9F. A third track comprises a first pass 470 and a second pass 478. A perpendicular distance $TP_{B2}$ between the centerline 463 of the first track 462 and the centerline 471 of the second track 474 is shown in FIG. 9F. As discussed above, there is a small amount of overlap between the each of the adjacent passes 450, 454, 458, 466, 470, and 478. However, the amount of overlap in the FIGS. 9A–9F is less than the overlap in FIGS. 5A–5F, and is also less than the overlap in FIGS. 7A–7F. As a result, the perpendicular distance $TP_{B2}$ shown in FIG. 9F is greater than the perpendicular distance $TP_{B0}$ shown in FIG. 5F. The perpendicular distance $TP_{B2}$ shown in FIG. 9F is also greater than the perpendicular distance $TP_{B1}$ shown in FIG. 7F.

Figure 10A:
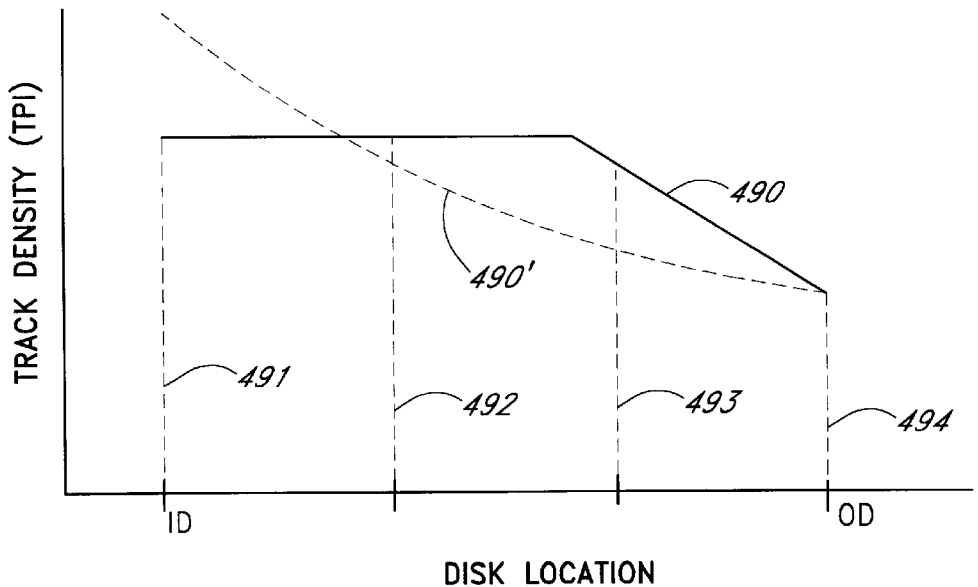
FIG. 10A shows a curve representing track density as a function of disk location wherein the effective track density is decreased near the outer circumference of the disk.

As discussed above, the wider track pitch $TP_{B2}$ results in a lower track density at the high skew condition compared to either $TP_{B0}$ or $TP_{B1}$. FIG. 10A shows a track density curve 490 that illustrates the track density profile across the storage medium 34 for the process illustrated in FIG. 9A–9F. As shown, the track density is less proximate the outer circumference (OD) than it is proximate the inner circumference (ID). This is achieved by varying the stepping increment of the push pin 224. As the head moves toward the higher skew condition near the outer circumference, the stepping increment of the push pin 224 is increased.

As discussed in more detail below in connection with FIG. 11, the storage medium 34 may be divided into three radial band of approximately equal radial width. A first radial band is illustrated on FIG. 10A as extending between a line 493 and a line 494. A second radial band is illustrated on FIG. 10A as extending between the a line 491 and a line 492. A third radial band is illustrated on FIG. 10A as extending between the line 492 and the line 493. The average servo track density of the first radial band is no greater than the average servo track density of the second band. The average servo track density of the first radial band is also no greater than the average servo track density of the third band.

The line 490 in FIG. 10A illustrates a first embodiment in which the stepping increment is adjusted to maintain a relatively constant track density for the second band (inner portion) and the third band (middle portion) and to decrease the track density in the first band (outer portion). A dashed line 490' illustrates an alternative embodiment in which the stepping increment is adjusted to produce a generally decreasing servo track density from the servo tracks proximate to the inner circumference to the servo tracks proximate the outer circumferences.

Figure 10B:
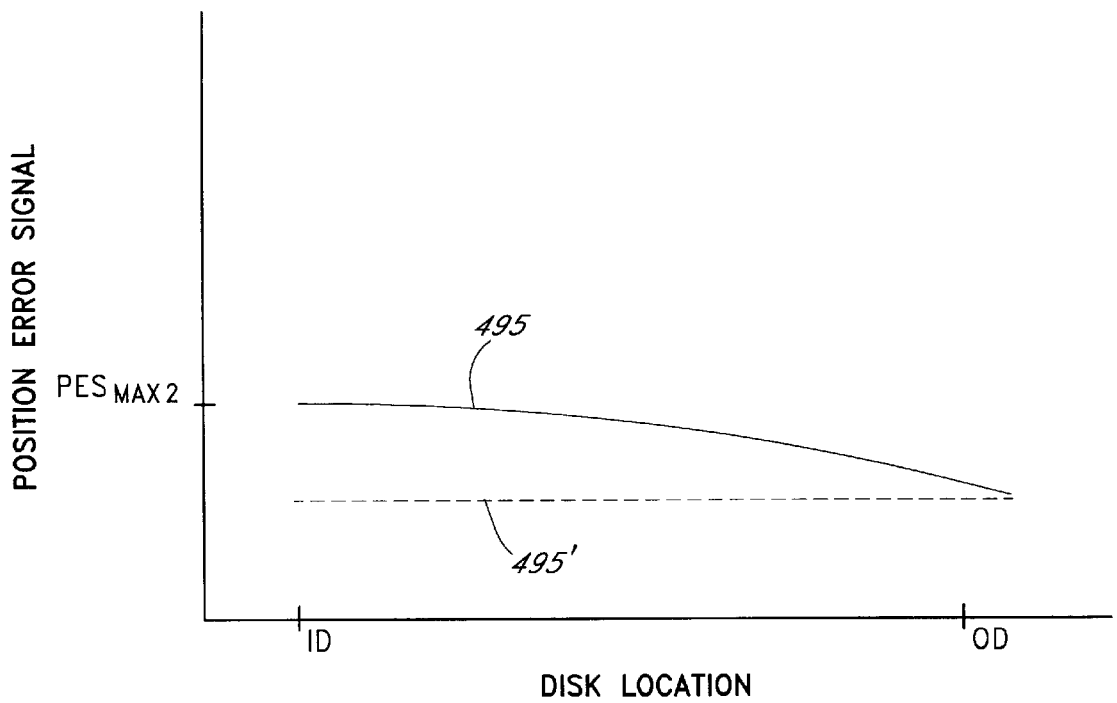
FIG. 10B shows the position error signal as a function of location for the curve shown in FIG. 10A.

FIG. 10B shows a PES curve 495 that illustrates the PES corresponding to the decreasing track density profile 490 of FIG. 10A. The PES values may still rise at the outer circumference compared to the inner circumference. However, the highest PES value at the outer circumference, $PES_{MAX2}$ is lower than the $PES_{MAX0}$ shown in FIG. 6B. The highest PES value at the outer circumference, $PES_{MAX2}$ is also lower than the $PES_{MAX1}$ shown in FIG. 8B. By lowering the PES value at the OD, the applicants have discovered that many more of the tracks at the OD that would have been retired, i.e., deemed unsuitable for storing data, can be used.

FIG. 10B also shows a PES curve 495' that illustrates an approximately constant PES corresponding to the continuously decreasing track density profile 490' of FIG. 10A.

Figure 11:
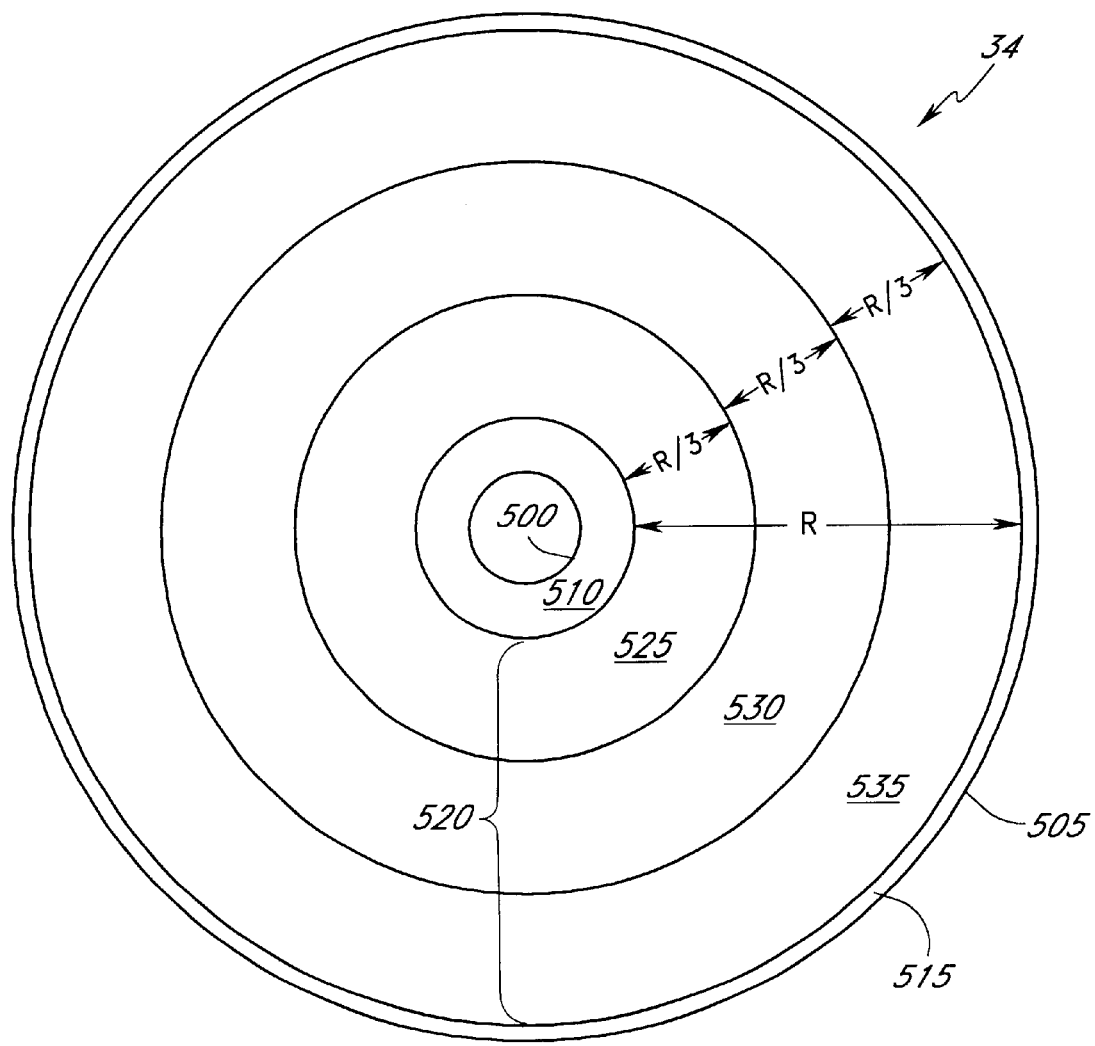
FIG. 11 pictorially represents a first radial band, a second radial band, and a third radial band of the disk.

FIG. 11 shows the storage medium 34, which, as discussed above, is mounted on the spindle motor 38. The storage medium 34 includes an inner circumference 500, and an outer circumference 505. The storage medium 34 also has a portion 515 proximate the outer circumference 505 that is not used for recording. This portion has a radial width of about 2–3 mm. The storage medium 34 also comprises a portion 510 proximate the inner circumference 500 that is not used for recording, but which may be used as a landing zone. The storage medium 34 also includes a magnetic-storage portion 520 between the inner circumference 500 and the outer circumference 505. The magnetic-storage portion 520 has a radial width R between the portion 510 and the portion 515. The magnetic-storage portion 520 includes a first radial band 535 proximate the outer circumference 505 that comprises about one-third of the radial width (i.e., approximately R/3). The first radial band comprises a first plurality of generally concentric servo tracks that are written at a first average servo track density. The magnetic-storage portion 520 also includes a second radial band 525 proximate the inner circumference 500 comprising about one-third the radial width (i.e., approximately R/3). The second radial band 525 comprises a second plurality of generally concentric servo tracks that are written at a second average servo track density. The magnetic-storage portion 520 also includes a third radial band 530 that is between the first radial band 535 and the second radial band 525, and that comprises about one-third the radial width (i.e., approximately R/3). The third radial band 530 comprises a third plurality of generally concentric servo tracks that are written at a third average servo track density. The first average servo track density is no greater than the second average servo track density. Also, the first average servo track density is no greater than the third average servo track density. Although the foregoing describes the storage medium 34 as having three radial bands 535, 530, and 525, these are not physical bands on the medium. The radial bands 535, 530, and 525 also are not magnetically divided in any way on the medium. The three radial bands 535, 530, and 525 are a way of grouping tracks in approximately equal thirds in the magnetic-storage portion 520.

What is claimed is:

1. A method for reducing position error signal in a disk drive comprising a recording head, a rotary actuator, a spindle motor, and a storage medium mounted on the spindle motor, the storage medium comprising an inner circumference, an outer circumference, and a magnetic-storage portion between the inner circumference and the outer circumference, the magnetic-storage portion having a radial width, the magnetic-storage portion comprising a first radial band proximate the outer circumference comprising about one-third of the radial width, a second radial band proximate the inner circumference comprising about one-third the radial width, and a third radial band between the first radial band and the second radial band comprising about one-third the radial width, the method comprising:

(a) writing a first plurality of servo tracks to the storage medium in the first radial band at a first average servo track density;

(b) writing a second plurality of servo tracks to the storage medium in the second radial band at a second average servo track density; and (c) writing a third plurality of servo tracks to the storage medium in the third radial band at a third average servo track density, the first average servo track density being no greater than the second average servo track density, and the first average servo track density being no greater than the third average servo track density.

2. The method of claim 1, wherein the first average servo track density is less than the second average servo track density, and wherein the first average servo track density is less than the third average servo track density.

3. A disk drive comprising:

a rotary actuator;

a recording head mounted on the rotary actuator;

a spindle motor; and a storage medium mounted on the spindle motor, the storage medium comprising:

an inner circumference, an outer circumference, and a magnetic-storage portion between the inner circumference and the outer circumference, the magnetic-storage portion having a radial width, the magnetic-storage portion comprising:

a first radial band proximate the outer circumference comprising about one-third of the radial width, the first radial band comprising a first plurality of generally concentric servo tracks, the first plurality of concentric servo tracks written at a first average servo track density;

a second radial band proximate the inner circumference comprising about one-third the radial width, the second radial band comprising a second plurality of generally concentric servo tracks, the second plurality of servo tracks written at a second average servo track density; and a third radial band between the first radial band and the second radial band comprising about one-third the radial width, the third radial band comprising a third plurality of generally concentric servo tracks, the third plurality of servo tracks written at a third average servo track density;

wherein the first average servo track density is no greater than the second average servo track density, and the first average servo track density is no greater than the third average servo track density.

4. The disk drive of claim 3, wherein the first average servo track density is less than the second average servo track density, and the first average servo track density is less than the third average servo track density.

5. A servo track writer for writing servo tracks on a storage medium of a head-disk assembly that comprises at least one recording head mounted on an actuator, the storage medium comprising an inner circumference, an outer circumference, and a magnetic-storage portion between the inner circumference and the outer circumference, the magnetic-storage portion having a radial width, the magnetic-storage portion comprising a first radial band proximate the outer circumference comprising about one-third of the radial width, a second radial band proximate the inner circumference comprising about one-third the radial width, and a third radial band between the first radial band and the second radial band comprising about one-third the radial width, the servo track writer comprising:

(a) a clock-head for writing a clock reference pattern to the storage medium, and for reading the clock reference pattern from the storage medium;

(b) a timing circuit that processes the clock reference pattern read from the storage medium and that generates a timing clock;

(c) a controller that processes the timing clock to determine the circumferential location of the recording head and that directs the recording head to write the servo tracks to the storage medium;

(d) a push pin; and (e) a head positioner circuit that comprises a positioning mechanism that actuates the push pin in a step-wise fashion to impart a step-wise movement to the actuator at a first average stepping increment when the recording head is over the first radial band, at a second average stepping increment when the recording head is over the second radial band, and at a third average stepping increment when the recording head is over the third radial band, the first average stepping increment being greater than the second stepping increment, and the first average stepping increment being greater than the third stepping increment.

6. A disk drive comprising:

a rotary actuator;

a recording head mounted on the rotary actuator;

a spindle motor; and a storage medium mounted on the spindle motor, the storage medium comprising an inner circumference, an outer circumference, and a magnetic-storage portion between the inner circumference and the outer circumference, the magnetic-storage portion having a radial width, the magnetic-storage portion comprising a first radial band proximate the outer circumference comprising about one-third of the radial width, a second radial band proximate the inner circumference comprising about one-third the radial width, and a third radial band between the first radial band and the second radial band comprising about one-third the radial width, the storage medium comprising servo tracks written by:

(a) writing a first plurality of servo tracks to the storage medium in the first radial band at a first average servo track density;

(b) writing a second plurality of servo tracks to the storage medium in the second radial band at a second average servo track density; and (c) writing a third plurality of servo tracks to the storage medium in the third radial band at a third average servo track density, the first average servo track density being no greater than the second average servo track density, and the first average servo track density being no greater than the third average servo track density.

7. The disk drive of claim 6, wherein the first average servo track density is less than the second average servo track density, and wherein the first average servo track density is less than the third average servo track density.

8. A servo writer and disk drive combination comprising:

a disk drive comprising a recording head, a rotary actuator, a spindle motor, and a storage medium mounted on the spindle motor, the storage medium comprising an inner circumference, an outer circumference, and a magnetic-storage portion between the inner circumference and the outer circumference, the magnetic-storage portion having a radial width, the magnetic-storage portion comprising a first radial band proximate the outer circumference comprising about one-third of the radial width, a second radial band proximate the inner circumference comprising about one-third the radial width, and a third radial band between the first radial band and the second radial band comprising about one-third the radial width; and a servo track writer comprising:

a clock head that reads a magnetic clock pattern in a clock track of the storage medium;

a timing circuit that processes the clock pattern and generates a timing clock;

a controller that processes the timing clock to determine the circumferential location of the head and that directs the head to write the servo tracks;

a push pin that engages the rotary actuator in the disk drive; and a head positioner circuit comprising a positioning mechanism that actuates the push pin in a step-wise fashion to impart a step-wise movement to the actuator at a first average stepping increment when the recording head is located over the first radial band, at a second average stepping increment when the recording head is located over the second radial band, and at a third average stepping increment when the recording head is located over the third radial band, the first average stepping increment being greater than the second average stepping increment, and the first average stepping increment being greater than the third average stepping increment.

* * * * *